(12) United States Patent
Yang et al.

(10) Patent No.: US 9,014,301 B2
(45) Date of Patent: Apr. 21, 2015

(54) DEDICATED REFERENCE SIGNAL

(75) Inventors: Lin Yang, San Diego, CA (US); Sandip Sarkar, San Diego, CA (US); Durga Prasad Malladi, San Diego, CA (US); Dung N. Doan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 813 days.

(21) Appl. No.: 12/780,774

(22) Filed: May 14, 2010

(65) Prior Publication Data

US 2011/0280333 A1 Nov. 17, 2011

(51) Int. Cl.
*H04L 27/00* (2006.01)
*H04L 5/00* (2006.01)

(52) U.S. Cl.
CPC ...................................... *H04L 5/003* (2013.01)

(58) Field of Classification Search
CPC ..... H04W 72/04; H04B 7/024; H04B 7/0486; H04B 7/0408; H04B 7/0669; H04L 5/006; H04L 5/0023; H04L 5/0037; H04L 1/0618
USPC .......... 375/299, 260, 296; 370/343, 330, 329, 370/328, 335, 252, 342; 455/450, 452, 509
See application file for complete search history.

(56) References Cited

U.S. PATENT DOCUMENTS

| | | | |
|---|---|---|---|
| 5,852,630 A | 12/1998 | Langberg et al. | |
| 7,940,740 B2 * | 5/2011 | Krishnamurthy et al. | 370/344 |
| 8,064,386 B2 * | 11/2011 | Pan et al. | 370/328 |
| 8,228,862 B2 * | 7/2012 | Nam et al. | 370/329 |
| 2007/0248113 A1 | 10/2007 | Ko et al. | |
| 2009/0046582 A1 * | 2/2009 | Sarkar et al. | 370/230.1 |
| 2010/0061360 A1 * | 3/2010 | Chen et al. | 370/342 |
| 2010/0091678 A1 * | 4/2010 | Chen et al. | 370/252 |
| 2010/0173639 A1 * | 7/2010 | Li et al. | 455/450 |
| 2010/0273499 A1 * | 10/2010 | van Rensburg et al. | 455/450 |
| 2010/0279625 A1 * | 11/2010 | Ko et al. | 455/68 |
| 2010/0322179 A1 * | 12/2010 | Yu et al. | 370/329 |
| 2010/0323709 A1 * | 12/2010 | Nam et al. | 455/450 |
| 2011/0038344 A1 * | 2/2011 | Chmiel et al. | 370/330 |
| 2011/0237270 A1 * | 9/2011 | Noh et al. | 455/450 |
| 2012/0002750 A1 * | 1/2012 | Hooli et al. | 375/295 |

(Continued)

FOREIGN PATENT DOCUMENTS

WO 2007022630 A1 3/2007

OTHER PUBLICATIONS

3GPP TR 25.814 V7.1.0 (Sep. 2009), "3rd Generation Partnership Project; Technical Specification Group Radio Access Network; Physical layer aspects for evolved Universal Terrestrial Radio Access (UTRA)" (Release 7), Sep. 2006.

(Continued)

*Primary Examiner* — Shuwang Liu
*Assistant Examiner* — Helene Tayong
(74) *Attorney, Agent, or Firm* — Kenyon S. Jenckes

(57) ABSTRACT

Systems and methodologies are described that facilitate utilizing dedicated reference signal in connection with downlink transmissions. A dedicated reference signal can comprise a set of dedicated reference symbols, which are inserted into a resource block in accordance with a specification provided by a dedicated reference signal structure. The dedicated reference signal structure can vary according to a rank utilized in the downlink transmission.

38 Claims, 15 Drawing Sheets

(56) References Cited

U.S. PATENT DOCUMENTS

2012/0039287 A1* 2/2012 Ko et al. ............... 370/329
2012/0220327 A1* 8/2012 Lee et al. ............... 455/509

OTHER PUBLICATIONS

3GPP TSG-RAN WG1 #49-bis, R1-072746, "Structure and Performance of DL Dedicated RS", Source: Qualcomm Europe, Orlando, USA, Jun. 25-29, 2007.
Alcatel-Lucent et al: "Dedicated 1-43 Reference Signals for Precoding in E-UTRA Downlink", 3GPP Draft; R1-072402, 3rd Generation Partnership Project (3GPP), Mobile Competence Centre ; 650, Route Des Lucioles ; F-06921 Sophia-Antipolis Cedex ; France, vol. RAN WGI, No. Kobe, Japan; May 2, 2007, XP050106130.
International Search Report and Written Opinion—PCT/US2011/036546, International Search Authority—European Patent Office—Sep. 26, 2011.
Motorola: "Proposal for Dedicated Pilots 1-43 in Downlink Precoding for EUTRA MIMO", 3rd Generation Partnership Project (3GPP); Technicalspecification Group (TSG) Radio Access Network (RAN); Workinggroup 1 (WGI), Meeting #48, 3 GPP TSG RAN WGI Meeting #48 St. Louis, vol. R1-070770, No. 48 Feb. 12, 2007, pp. 1-5, XP002494688.
Qualcomm Europe: "Link Analysis for 1-43 Dedicated Pilot based Demodulation", 3GPP Draft; R1-071291, 3rd Generation Partnership Project (3GPP), Mobile Competence Centre ; 650, Route Des Lucioles ; F-06921 Sophia-Antipolis Cedex ; France, vol. RAN WGI, No. St. Julian; Apr. 3, 2007, XP050105254.
Taiwan Search Report—TW100117117—TIPO—Jan. 20, 2014.

* cited by examiner

DEDICATED REFERENCE SIGNAL

BACKGROUND

I. Field

The following description relates generally to wireless communications, and more particularly to employing dedicated reference signals in downlink transmissions.

II. Background

Wireless communication systems are widely deployed to provide various types of communication content such as voice and data, Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

To facilitate coherent demodulation and decoding of a transmission sent via wireless channel, channel estimation can be employed. In one example, a channel response can be estimated by embedding a known reference signal in the transmission. The reference signal can be analyzed by a receiver to facilitate estimating the channel response, which can approximate alterations to transmitted symbols due to channel conditions. The approximate alterations can assist a receiver during symbol identification, demodulation, and decoding.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating utilizing dedicated reference signal in connection with downlink transmissions. A dedicated reference signal can comprise a set of dedicated reference symbols, which are inserted into a resource block in accordance with a specification provided by a dedicated reference signal structure. The dedicated reference signal structure can vary according to a rank utilized in the downlink transmission.

According to related aspects, a method is provided that includes identifying a rank of a downlink transmission to a mobile device, wherein the rank indicates utilization of one of two or four antennas. The method also includes inserting a set of dedicated reference symbols into a resource block in accordance with a dedicated reference signal structure, wherein the dedicated reference signal structure is associated with the rank. In addition, the method can include employing a beamforming technique to transmit the resource block that includes the set of dedicated reference symbols to the mobile device.

Another aspect relates to a wireless communications apparatus. The wireless communications apparatus can include at least one processor configured to select a dedicated reference signal structure based upon a rank of a transmission, wherein the rank indicates that the transmission utilizes one of two or four antennas. The at least one processor is further configured to incorporate a dedicated reference signal comprising a set of dedicated reference symbols into a resource block in accordance with the dedicated reference signal structure selected. In addition, the at least one processor is further configured to utilize a beamforming technique to transmit the resource block with the dedicated reference signal incorporated.

Yet another aspect relates to an apparatus. The apparatus includes means for identifying a rank of a downlink transmission to a mobile device, wherein the rank indicates utilization of one of two or four antennas. The apparatus can also include means for inserting a set of dedicated reference symbols into a resource block in accordance with a dedicated reference signal structure, wherein the dedicated reference signal structure is associated with the rank. Further, the apparatus includes means for employing a beamforming technique to transmit the resource block that includes the set of dedicated reference symbols to the mobile device.

Still another aspect relates to a computer program product, which can have a computer-readable medium including code for causing at least one computer to select a dedicated reference signal structure based upon a rank of a transmission, wherein the rank indicates that the transmission utilizes one of two or four antennas. The computer-readable medium can also comprise code for causing the at least one computer to embed a dedicated reference signal comprising a set of dedicated reference symbols into a resource block in accordance with the dedicated reference signal structure selected. In addition, the computer-readable medium can include code for causing the at least one computer to utilize a beamforming technique to transmit the resource block with the dedicated reference signal incorporated.

Moreover, an additional aspect relates to an apparatus that includes a rank selection module that determine a rank level associated with a downlink transmission, wherein the rank level can be one of two or four. The apparatus can also include a dedicated reference signal module that generates a dedicated reference signal comprising a set of dedicated reference symbols, the dedicated reference signal module incorporates the dedicated reference signal into a resource block in accordance with a dedicated reference signal structure selected based upon the rank level. In addition, the apparatus can include a precoder module that applies a beamforming technique to the resource block with the dedicated reference signal incorporated and a transmitter that sends the resource block with the dedicated reference signal incorporated on a downlink channel.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
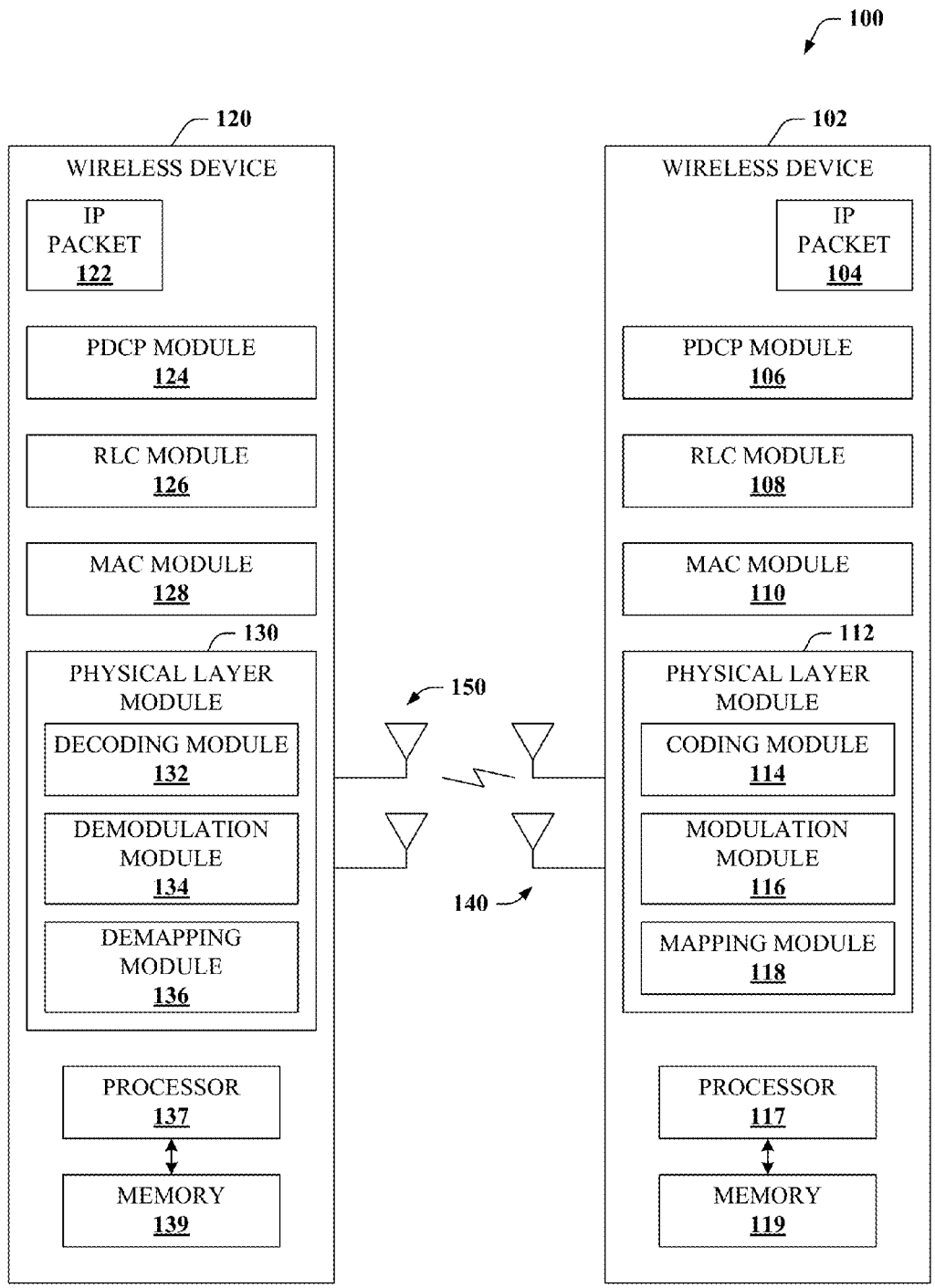
FIG. 1 illustrates an example wireless communication system that employs dedicated reference signals to facilitate downlink channel estimation in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards.

A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to the drawings, FIG. 1 illustrates an example wireless network 100 that employs dedicated reference signals to facilitate downlink channel estimation in accordance with various aspects. Wireless network 100 includes wireless devices 102 and 120 that communication with one another over a wireless network. In one example, wireless devices 102 and/or 120 can be an access point, such as a macrocell access point, femtocell or picocell access point, eNB, mobile base station, a portion thereof, and/or substantially any device or apparatus that provides access to a wireless network. In another example, wireless devices 102 and/or 120 can be a mobile device, such as a UE, a portion thereof, and/or substantially any device or apparatus that receives access to a wireless network.

Wireless device 102 can comprise multiple communication layers to facilitate transmitting/receiving data with wireless device 120. For example, wireless device 102 can include a packet data convergence protocol (PDCP) module 106 that can compress packet headers and facilitate ciphering and integrity protection of data. Wireless device 102 can also include a radio link control (RLC) module 108 that effectuates segmentation/concatenation, retransmission handling, and in-sequence delivery to higher layers, a medium access control (MAC) module 110 that enacts logical channel multiplexing, hybrid automatic repeat request (HARD) retransmissions, scheduling, and a physical layer module 112 that manages coding/decoding, modulation/demodulation, and antenna/resource mapping. Similarly, wireless device 120 can include a PDCP module 124, an RLC module 126, a MAC module 128, and physical layer module 130 that provide the same or similar functionality.

According to an example, wireless device 102 can transmit an Internet Protocol (IP) packet 104 to wireless device 120 via a wireless channel. The wireless channel can be a downlink channel or an uplink channel. Higher layers (not shown) of wireless device 102 can generate IP packet 104 or otherwise receive IP packet 104 for transmitting to one or more devices. Higher layers can include an application layer, an IP layer, and/or the like. PDCP module 106 can receive IP packet 104 from higher layers and generate one or more PDCP service data units (SDUs). PDCP module 106 can perform IP header compression on IP packet 104. In addition, PDCP module 106 can cipher IP packet 104 and/or provide integrity protection on IP packet 104. PDCP module 106 can further generate a PDCP protocol data unit (PDU) by combining a compressed and ciphered IP packet 104 (e.g., a PDCP SDU) with a PDCP header that includes at least a sequence number related to the PDCP SDU. The PDCP PDU can be provided to RLC module 108, which can segment and concatenate one or more PDCP PDUs into an RLC PDU along with an RLC header. For instance, based upon a resource scheduling decision, a particular amount of data is elected for transmission from an RLC buffer managed by RLC module 108, which segments and concatenates one or more PDCP PDUs to generate the RLC PDU.

RLC module 108 provides the RLC PDU to MAC module 110, which offers MAC layer services (e.g., multiplexing, HARQ retransmissions, scheduling, etc.) to RLC module 108 in the form of logical channels. A logical channel can be characterized based upon the type of information carried. For instance, logical channels offered by MAC module 110 can include a broadcast control channel (BCCH) which carries system information from a wireless network to mobile devices, a paging control channel (PCCH) utilized for paging mobile devices, a common control channel (CCCH) which carries control information in conjunction with random access, a dedicated control channel (DCCH) which carries control information to and/or from mobile devices, a dedicated traffic channel (DTCH) utilized for user data to and/or from mobile devices, and a multicast control channel (MCCH) utilized carries control information in connection with a multicast traffic channel (MTCH), which carries transmission of multimedia broadcast multicast services.

MAC module 110 can map logical channels to transport channels, which represent services provided by physical layer module 112. Data on a transport channel is organized into transport blocks. For a given transmission time interval (TTI), one or more transport blocks are transmitted over a radio interface. In one example, MAC module 110 multiplexes RLC PDUs into one or more transport blocks.

The transport blocks can be provided to physical layer module 112, which facilitates coding, modulation, multi-antenna processing, and/or mapping of a signal to physical time-frequency resources (e.g., resource elements). According to an example, physical layer module 112 can introduce a cyclic redundancy check (CRC) to a transport block to facilitate error detection. In addition, physical layer module 112 can include a coding module 114 that codes bits of the transport block. In one example, Turbo coding can be employed by the coding module 114. Physical layer module 112 can include a modulation module 116 that modulates the coded bits to generate symbols. Physical layer module 112 can utilize a mapping module 118 to configure antennas to provide different multi-antenna transmission schemes such as transmit diversity, beamforming, and/or spatial multiplexing.

In addition, the mapping module 118 can map symbols to physical resource elements to enable transmission over the air.

Wireless device 102 can utilize one or more antenna(s) 140 to transmit IP packet 104 to wireless device 120 which can receive the transmission via antenna(s) 150. While FIG. 1 depicts two antennas respectively associated with wireless devices 102 and 120, it is to be appreciated that wireless device 102 and 120 can include substantially any number of antennas. After reception of IP packet 104 from wireless device 104, wireless device 120 can employ physical layer module 130 to decode and demodulate a transmission. For example, the physical layer module 130 can include a demapping module 136 that demaps resources elements to recover a set of symbols. Physical layer module 130 can also employ a demodulation module 134, which demodulates the set of symbols to recover a set of coded bits. In addition, a decoding module 132 is included in physical layer module 130 to decode the set of coded bits to generate a transport block. The transport block can be provided to MAC module 128 to manage a HARQ retransmission, if necessary due to errors (e.g., decode errors, transmission errors, etc.) and to facilitate MAC demultiplexing to generate one or more RLC PDUs. The one or more RLC PDUs can be provided to RLC module 126 for reassembly. For instance, the RLC PDUs can comprise one or more RLC SDUs and/or portions thereof. Accordingly, the RLC module 126 reconstructs the RLC SDUs from the RLC PDUs. The reassembled RLC SDUs can be processed by PDCP module 124, which deciphers and decompresses the RLC SDUs to recover one or more data packets such as IP packet 122.

It to be appreciated that wireless device 120 can utilize similar functionality and/or similar modules as wireless device 102 to transmit a data packet to wireless device 102. Further, wireless device 102 can employ similar components and/or functionality described above with reference to wireless device 120 to receive a transmission from disparate devices, such as wireless device 120.

Pursuant to an example in which wireless device 102 sends IP packet 104 to wireless device 120, wireless device 120 can utilize an estimate of the downlink channel to facilitate coherent demodulation of a downlink physical channel employed to transmit IP packet 104. To enable channel estimation, wireless device 102 can include a reference signal in a transmission to wireless device 120. In one example, wireless device 102 incorporates reference symbols of the reference signal when the transmission is an OFDM transmission. For instance, the wireless device 102 can employ physical layer module 112 and/or mapping module 118 to map reference symbols to resource elements within the TTI corresponding to the transmission to wireless device 120. In an aspect, the reference signal can be a cell-specific reference signal, which can be transmitted in many downlink subframes and can span up to an entire bandwidth of the downlink. The reference signal can also be a dedicated reference signal, which is transmitted in subframes intended for a particular receiving device.

In an aspect, wireless devices 102 and/or 120 can be configured to operate in accordance with one of a variety of transmission modes. In general, the transmission mode relates to a mode selected for a wireless channel, such as a physical downlink shared channel (PDSCH), when employed for user data transmissions. For example, the transmission mode can configure a multi-antenna technique utilized for a transmission of user data. Wireless device 102 and 120 can be configured to employ potential transmission modes such as, but not limited to, a transmission via a single antenna port, transmit diversity (e.g., with two or more antenna ports utilizing space-frequency block code), open-loop spatial multiplexing, closed-loop spatial multiplexing, multi-user MIMO, closed-loop pre-coding, and beamforming. With the exception of beamforming (e.g., transmission mode seven in LTE Release 8), cell-specific reference signals are utilized in connection with data transmissions. For beamforming, dedicated reference signals are employed.

Further to the example in which wireless device 102 transmits to wireless device 102, wireless devices 102 and 120 can be configured to utilize general beamforming or non-codebook based beamforming (e.g., transmission mode seven) as the transmission mode. To enable wireless device 120 to generate a channel estimate for such a transmission, a dedicated reference signal is incorporated and beamformed in a similar manner as the data transmission. In an example, the wireless device 102 can utilize physical layer module 112 to generate the dedicated reference signal and mapping module 118 can insert dedicated reference symbols, which comprise the dedicated reference signal, at particular resource elements in accordance with a dedicated reference signal structure.

According to an example, a dedicated reference signal structure can be described in terms of a resource block (e.g., a group of resource elements). A resource block can be provided as a time-frequency grid having a one TTI (e.g., one subframe) duration and spanning twelve sub-carriers. A subframe can include two slots, each being six or seven symbols in length, depending on a cyclic prefix employed. In this regard, a resource block can comprise a 12×12 grid or a 12×14 grid of resource elements. It should be appreciated, however, that other resource block definitions can be provided and, further, the dedicated reference signal structures described below can be utilized with varying resource block definitions.

In another aspect, the dedicated reference signal structure can be based at least in part on a rank level utilized for the beamformed transmission. The rank level or number indicates a number of layers transmitted or a number of antennas employed in the beamformed transmission. In an example, a greater number of dedicated reference symbols can be utilized in the dedicated reference signal when the rank level increases. For instance, for a rank-1 (e.g., one layer or antenna), a dedicated reference signal structure that includes twelve symbols per resource block can be employed. In another example, a dedicated reference signal with eighteen symbols per resource block can be employed for a rank-2 transmission and a dedicated reference signal with twenty-four symbols per resource block can be utilized for a rank-4 beamformed transmission.

In this regard, a dedicated reference signal structure can be selected based upon the rank utilized for a particular beamformed transmission. The selected reference signal structure includes a sufficient amount of reference symbols to enable generation of a channel estimate while mitigating overhead (e.g., data displacement). In an aspect, the dedicated reference signal structures described herein enable high data throughput even in high mobility situations. It is to be appreciated that 3GPP, 3GPP LTE, UMTS, CDMA, WiMAX, WiFi, and/or other technologies can utilize the concepts presented herein to efficiently employ beamforming based upon dedicated reference signals.

As further illustrated in system 100, wireless device 102 can include a processor 117 and/or a memory 119, which can be utilized to implement some or all of the functionality of PDCP module 106, RLC module 108, MAC module 110, and physical layer module 112. Similarly, FIG. 1 illustrates that wireless device 120 can also include a processor 137 and/or a memory 139, which can be employed to implement some or all of the functionality of PDCP module 124, RLC module 126, MAC module 128, and physical layer module 130. In an example, memory 119 and/or 139 can retain a computer program product that effectuates utilization of dedicated reference signals. For instance, memory 119 and/or 139, as a computer-readable medium, can comprise code for causing at least one computer to code for causing at least one computer to select a dedicated reference signal structure based upon a rank of a transmission, wherein the rank indicates that the transmission utilizes one of two or four antennas, code for causing the at least one computer to embed a dedicated reference signal comprising a set of dedicated reference symbols into a resource block in accordance with the dedicated reference signal structure selected and/or code for causing the at least one computer to utilize a beamforming technique to transmit the resource block with the dedicated reference signal incorporated.

Figure 2:
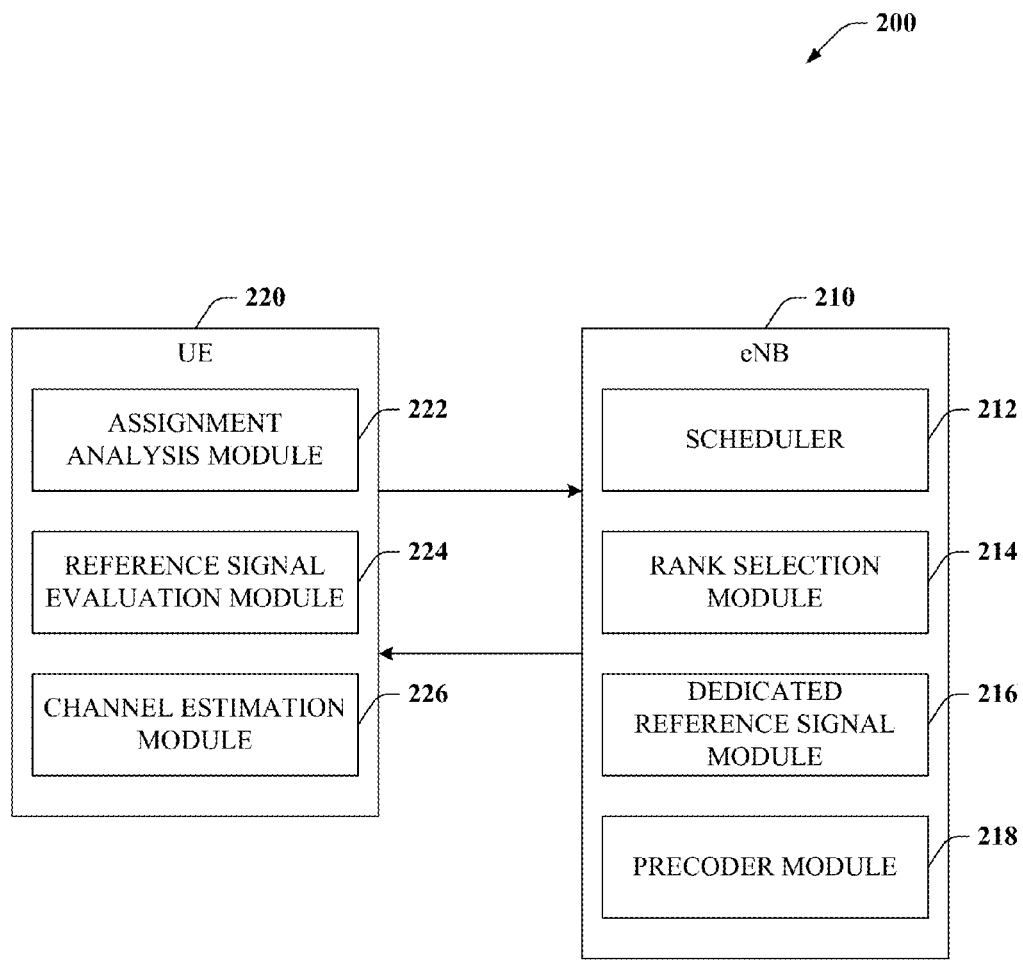
FIG. 2 is an illustration of an example system that facilitates selection and insertion of dedicated reference signals in accordance with various aspects.

Referring next to FIG. 2, a wireless communication system 200 facilitates selection and insertion of optimal dedicated reference signals in accordance with various aspects. As FIG. 2 illustrates, system 200 can include a user equipment unit (UE) 220, which can communicate with an eNodeB (eNB) 210 (e.g., a base station, an access point, a cell, etc.). While only UE 220 and eNB 210 are illustrated in FIG. 2, it should be appreciated that system 200 can include any number of UEs and/or eNBs. In accordance with an aspect, eNB 210 can transmit information to UE 220 over a forward link or downlink channel and UE 220 can transmit information to eNB 210 over a reverse link or uplink channel. It should be appreciated that system 200 can operate in an OFDMA wireless network, a CDMA network, a 3GPP LTE or LTE-A wireless network, a 3GPP2 CDMA2000 network, an EV-DO network, a WiMAX network, etc.

In an aspect, eNB 210 can transmit data to UE 220 utilizing beamforming. For example, UE 220 can be configured, via higher layers (e.g., radio resource control (RRC), etc.), to employ one of a several transmission modes for a given data transmissions. For instance, UE 220 can be configured to receive and eNB 210 can be configured to transmit data employing general or non-codebook based beamforming. For instance, eNB 210 can employ eigen-beamforming, rank-one beamforming, or the like. With general beamforming, a dedicated reference signal is inserted into the transmission and beamformed in a same manner as data.

To facilitate beamforming, eNB 210 can comprise a scheduler 212 which schedules and assigns radio resource to one or more mobile devices, such as UE 220, to accommodate uplink and downlink data transmissions. In an example, scheduler 212 can assign one or more resource blocks to UE 220 for a downlink transmission. The one or more resource blocks can be within the same subframe or located within disparate subframes. eNB 210 can utilize a rank selection module 214 to facilitate determination of a rank level to employ in a beamformed downlink transmission to UE 220. In accordance with an aspect, the rank level can be an integer from one to a number of antennas available to eNB 210. The rank selection module 214 can select the rank of a transmission based upon feedback from UE 220 (e.g., a rank indicator). In addition, the rank selection module 214 can determine a rank based upon an amount of data to be transmitted to UE 220.

In another aspect, eNB 210 can include a dedicated reference signal module 216 that generates a dedicated reference signal and inserts the dedicated reference signal into the one or more resource blocks scheduled for UE 220. The dedicated reference signal module 216 can generate a dedicated reference signal and/or map the dedicated reference signal to one or more resource elements in accordance with a dedicated reference signal structure. In one example, disparate dedicated reference signal structures can be employed for varying rank levels. For instance, a dedicated reference signal structure that includes eighteen reference symbols per resource block can be employed for a rank-2 beamformed transmission. According to another example, a dedicated reference signal structure with twenty-four reference symbols per resource block can be employed for a rank-4 beamformed transmission. In addition, the dedicated reference signal module 216 can incorporate dedicated reference symbols into the one or more resource blocks in accordance with one or more formats. For example, the dedicated reference signal module 216, for a rank-2 beamformed transmission, can map pairs of reference symbols to consecutive symbols in a resource block, wherein the consecutive symbols are located on the same frequency sub-carrier. In addition, respective pairs of reference symbols, placed in the aforementioned manner, can be separated by at least three symbols in the time domain and by at least four subcarriers in the frequency domain. The format described above is one example and is not intended to limit the appended claims. It is to be appreciated that other formats, including formats presented herein and/or readily derived therefrom, can be utilized to map reference symbols to resource elements in resource blocks.

The one or more resource blocks, with dedicated reference signal incorporated, can be beamformed and transmitted to UE 220. UE 220 can include an assignment analysis module 222 that identifies one or more resource blocks in one or more subframes that are allocated to UE 220. The assignment analysis module 222 can analyze control information included on a control channel, such as a physical downlink control channel (PDCCH), to identify the one or more resource blocks. In addition, the assignment analysis module 222 can identify a rank corresponding to a scheduled beamformed transmission.

After reception of the one or more resource blocks, UE 220 can employ a reference signal evaluation module 224 to extract dedicated reference symbols from the one or more resource blocks. In one example, the reference signal evaluation module 224 can identify dedicated reference symbols inserted in the one or more resource blocks via knowledge of the dedicated reference signal structure employed by eNB 210. The dedicated reference symbols can be provided to a channel estimation module 226, which generates a channel estimate to facilitate demodulation of data in the one or more resource blocks associated with the dedicated reference symbols.

In one example, eNB 210 can include a precoder module 218 that facilitates beamforming and/or precoding. The precoder module 218 can employ frequency-selective precoding or frequency non-selective precoding. With frequency-selective precoding, an optimal precoding index and rank information is generated individually for each resource block. A frequency selective precoding matrix indicator report can be based on one resource block averaging. With frequency non-selective precoding, one optimal precoding index and corresponding rank information is generated over an operating bandwidth.

Referring to FIGS. 3-8, dedicated reference signal structures that can be utilized in accordance with various aspects set forth herein are illustrated. For the purposes of simplicity of explanation, the dedicated reference signal structures are shown and described in the context of a resource block comprising twelve subcarriers in the frequency domain and a one TTI duration having two slots with seven symbols each in the time domain. It is to be understood and appreciated that the dedicated reference signal structures are not limited by the constraints of the depicted resource blocks, as some resource blocks can, in accordance with one or more embodiments, include different dimensions (e.g., different number of subcarriers and/or different durations (number of symbols)). Moreover, the dedicated reference signal structures depicted and described herein are indexed, in the frequency domain, by an index corresponding to each subcarrier. As shown in FIGS. 3-8, subcarriers are indexed from 0 to 11 starting with a top or higher frequency subcarrier. In addition, the dedicated reference signal structures are indexed, in the time domain, by an index corresponding to each symbol with a slot, wherein two slots are depicted. The symbols are indexed from 0 to 6 starting with the beginning of the slot. It is to be appreciated that the structures are not limited to the indexing convention illustrated herein, and other conventions can be employed. For example, those skilled in the art will understand and appreciate that the dedicated reference signals can be represented with other labeling conventions for resource blocks. Further, it is to be appreciated that the structures depicted in FIGS. 3-8 are intended to encompass equivalent structures derived via shifting reference symbol locations in the time domain and/or the frequency domain.

Figure 3:
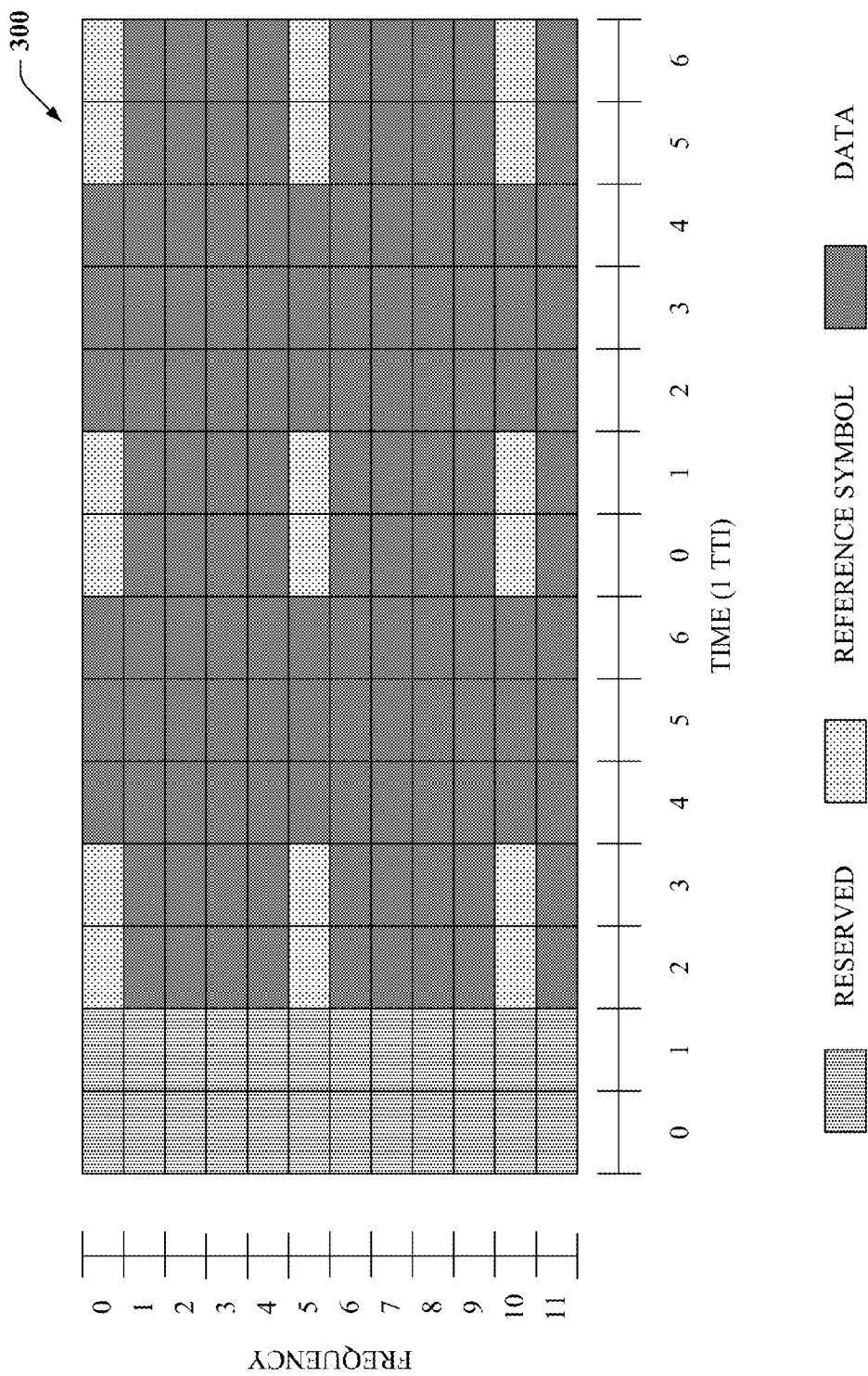
FIGS. 3-8 illustrate example reference signal structures that can be utilized to implement various aspects of the functionality described herein.

Turning to FIG. 3, an example dedicated reference signal structure 300 is depicted. Structure 300 can be utilized in connection with a rank-2 beamforming transmission to a mobile device. Structure 300 includes a set of reserved tones (e.g., resource elements) which can occupy zero or more symbols at the beginning of the resource block. Although depicted, in FIG. 3, as occupying the first two symbols, it is to be appreciated that reserved resource elements can occupy zero symbols, one symbol and/or occupy three or more symbols. In one example, the reserved resource elements can be allocated for PDCCH to carry control information.

In an example, structure 300 can include a dedicated reference signal which comprises eighteen dedicated reference symbols. As shown in FIG. 3, the dedicated reference symbols can be organized into pairs of symbols placed in consecutive symbols on a particular subcarrier. Respective pairs of reference symbols can be separated by three symbols and/ or four subcarriers (e.g., pairs of reference symbols can be inserted every three symbols and/or four subcarriers). In accordance with another example, a first pair of reference symbols can be placed on subcarrier 0 during the first symbols following the reserved portion. Additional pairs can be placed every three symbols and/or four subcarriers within the bounds of the resource block.

Figure 4:
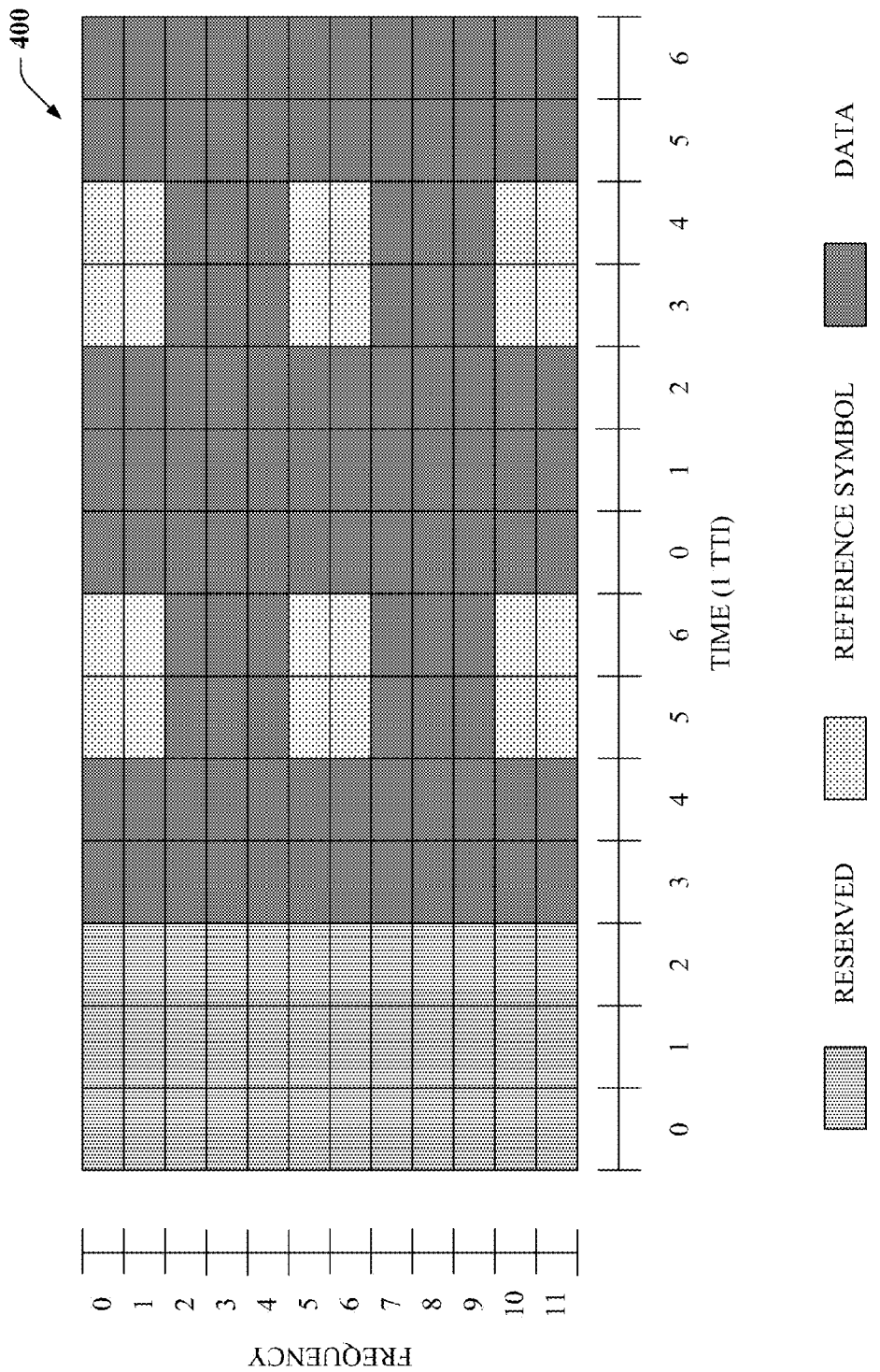

Referring now to FIG. 4, an example dedicated reference signal structure 400 is depicted. Structure 400 can be utilized in connection with a rank-4 beamforming transmission to a mobile device. In an example, structure 400 can include a dedicated reference signal that comprises twenty-four dedicated reference symbols. The reference symbols can be organized into groups of four reference symbols spanning a two-subcarrier by two-symbol square. Groups can be spaced at intervals spanning at least three subcarriers and located at the last two symbols of the first slot and symbols 3 and 4 of the second slot. It is to be appreciated that the groups of reference symbols can be shifted right or left in the time domain. Moreover, the groups of reference symbols can be inserted into the resource block with a three symbol separation therebetween.

Figure 5:
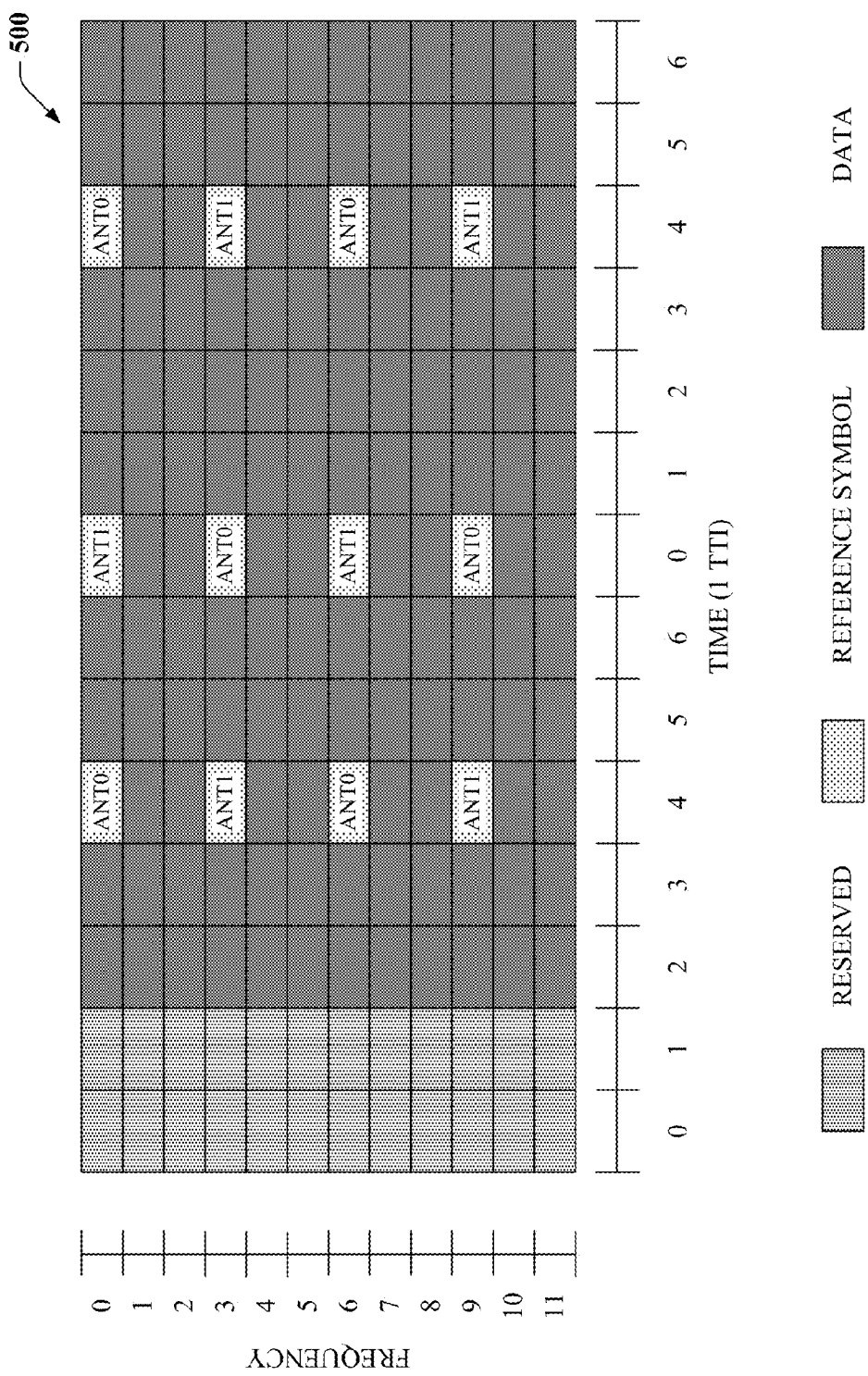

Turning to FIG. 5, illustrated is a dedicated reference signal structure 500. According to an example, structure 500 can be employed with a rank-2 beamforming transmission to a mobile device. The dedicated reference signal depicted in structure 500 can include twelve dedicated reference symbols. The reference symbols can be placed at symbol 4 of the first slot and symbols 0 and 4 of the second slot. In an example, four reference symbols can be placed at the aforementioned symbol locations and separated by two subcarriers. According to another example, structure 500 can be a frequency-division multiplexing (FDM) reference signal structure, wherein dedicated reference symbols or tones can be mapped to different layers and/or antennas. For instance, dedicated reference symbols illustrated in FIG. 5 are labeled to indicate a layer/antenna mapping. It is to be appreciated that the labels depicted in FIG. 5 are but one example mapping and that other mappings can be utilized.

Figure 6:
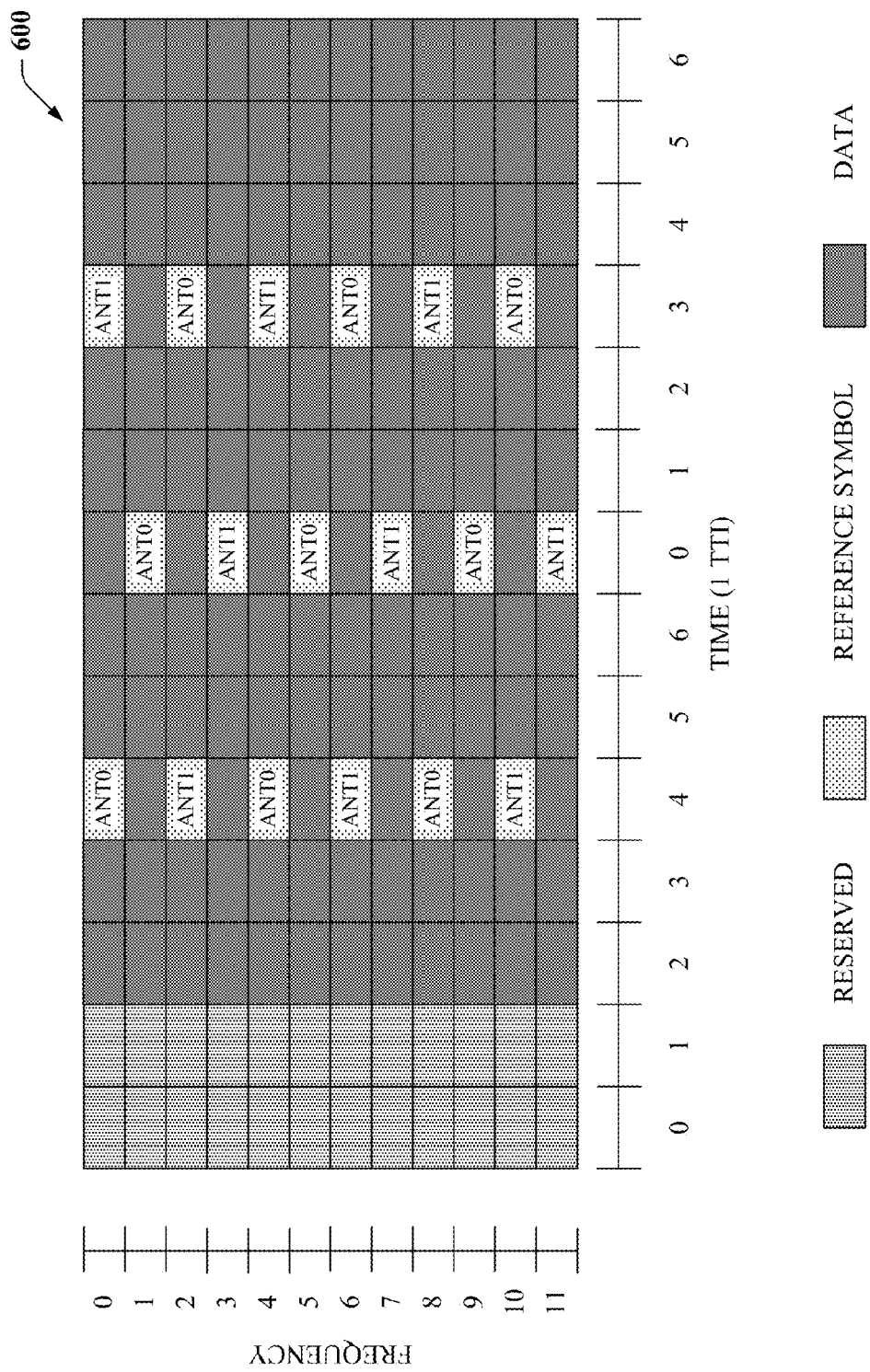

Referring now to FIG. 6, an example dedicated reference signal structure 600 is illustrated. Structure 600 can be utilized in connection with a rank-2 beamforming transmission. The dedicated reference signal depicted in structure 600 can include eighteen dedicated reference symbols. The reference symbols can be placed at symbol 4 of the first slot and symbols 0 and 3 of the second slot. In an example, six reference symbols can be placed at the aforementioned symbol locations and separated by a one subcarrier span. According to another example, structure 600 can be a frequency-division multiplexing (FDM) reference signal structure, wherein dedicated reference symbols or tones can be mapped to different layers and/or antennas. It is to be appreciated that the labels depicted in FIG. 6 are but one example mapping and that other mappings can be utilized.

Figure 7:
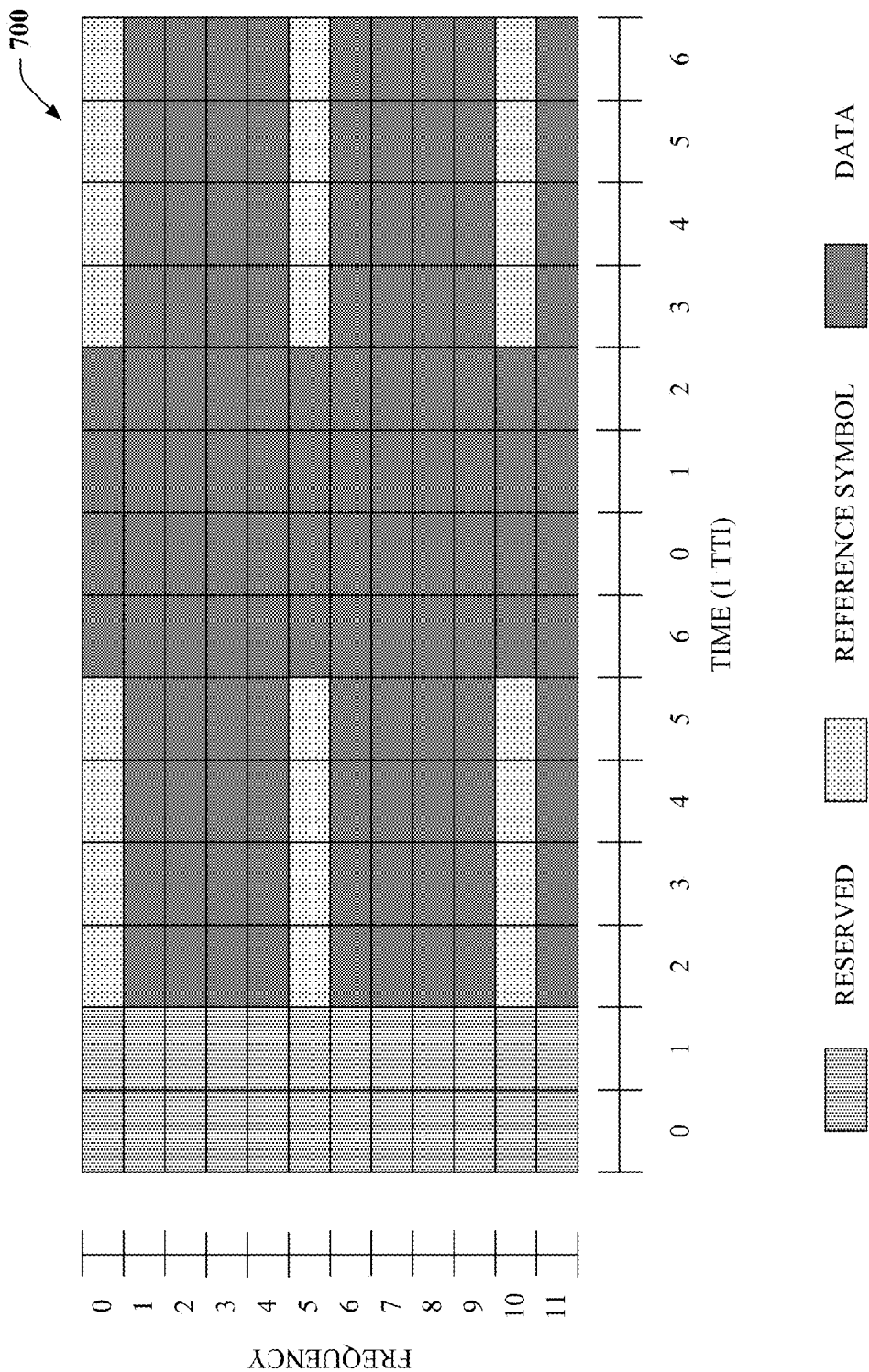

Referring now to FIG. 7, an example dedicated reference signal structure 700 is depicted. Structure 700 can be utilized in connection with a rank-2 beamforming transmission to a mobile device. In an example, structure 700 can include a dedicated reference signal that comprises twenty-four dedicated reference symbols. The reference symbols can be organized into groups of four reference symbols spanning four symbols on a particular subcarrier. Groups can be spaced at intervals, in the time domain, spanning four symbols and at intervals, in the frequency domain, of four subcarriers.

Figure 8:
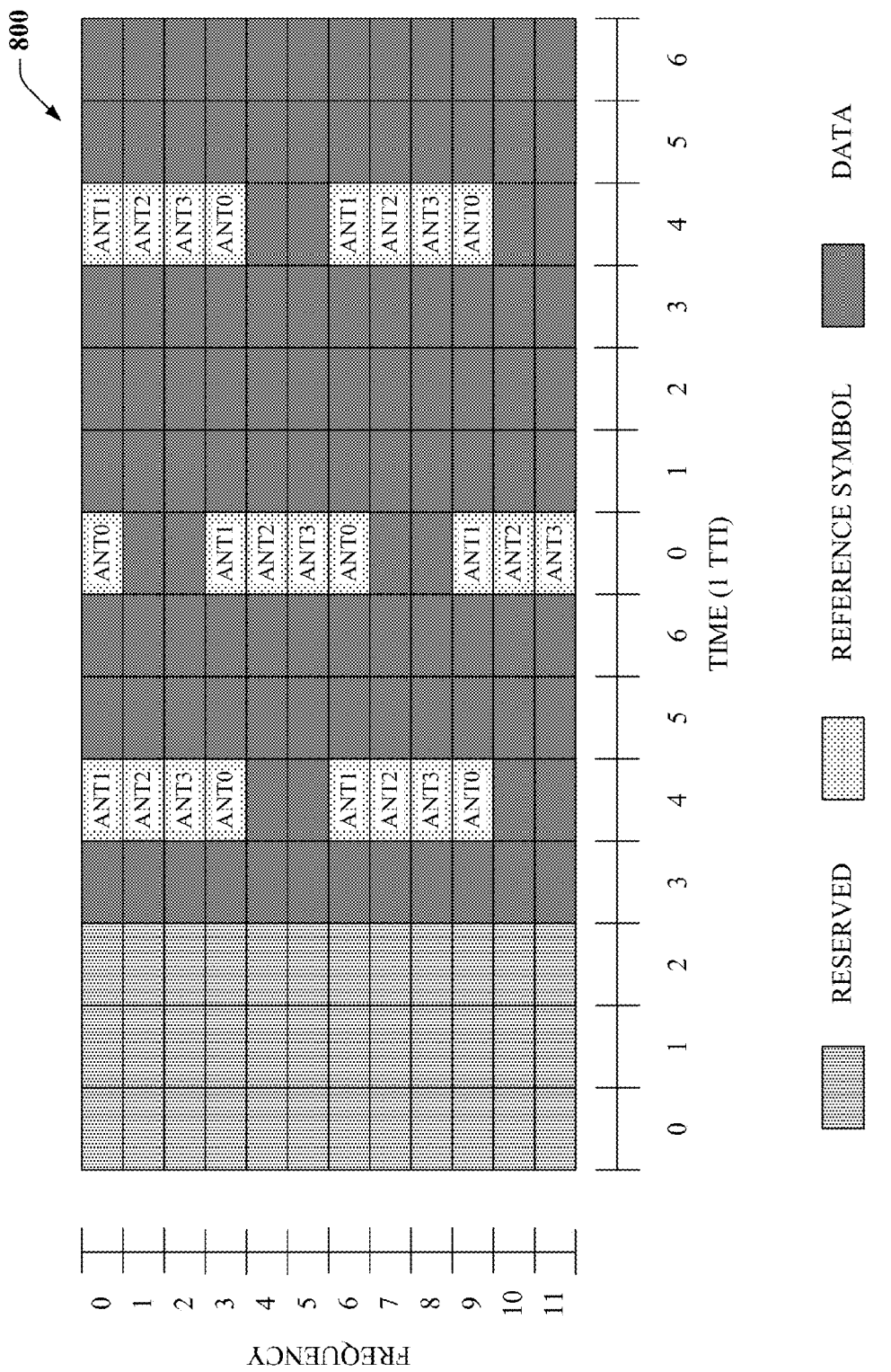

Turning to FIG. 8, illustrated is an example dedicated reference signal structure 800. Structure 800 can be utilized in connection with a rank-4 beamforming transmission to a mobile device. In an example, structure 800 can include a dedicated reference signal that comprises twenty-four dedicated reference symbols. The reference symbols can be organized into groups of four reference symbols spanning four consecutive subcarriers in the frequency domain. Groups can be spaced at intervals, in the time domain, spanning two symbols and at intervals, in the frequency domain, of two subcarriers. According to another example, structure 800 can be a frequency-division multiplexing (FDM) reference signal structure, wherein dedicated reference symbols or tones can be mapped to different layers and/or antennas. It is to be appreciated that the labels depicted in FIG. 8 are but one example mapping and that other mappings can be utilized.

Figure 9:
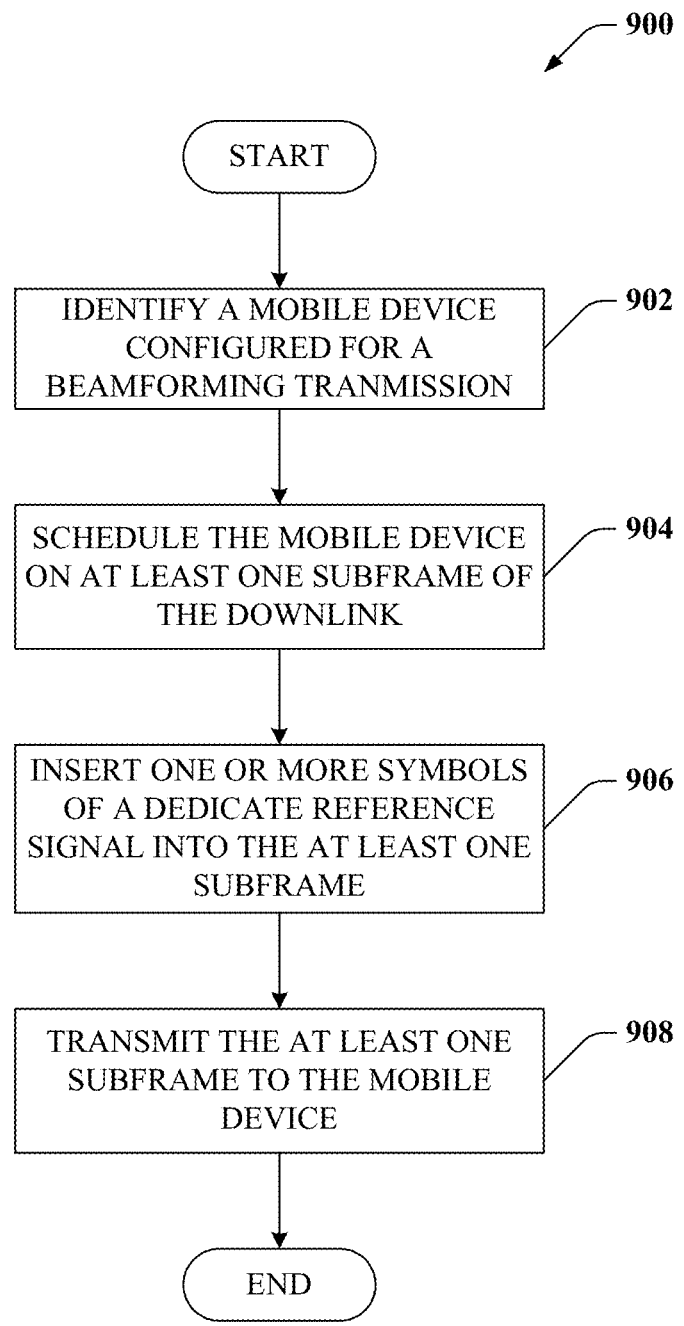
FIG. 9 is an illustration of an example methodology for employing a dedicated reference signal structure in accordance with various aspects.
Figure 10:
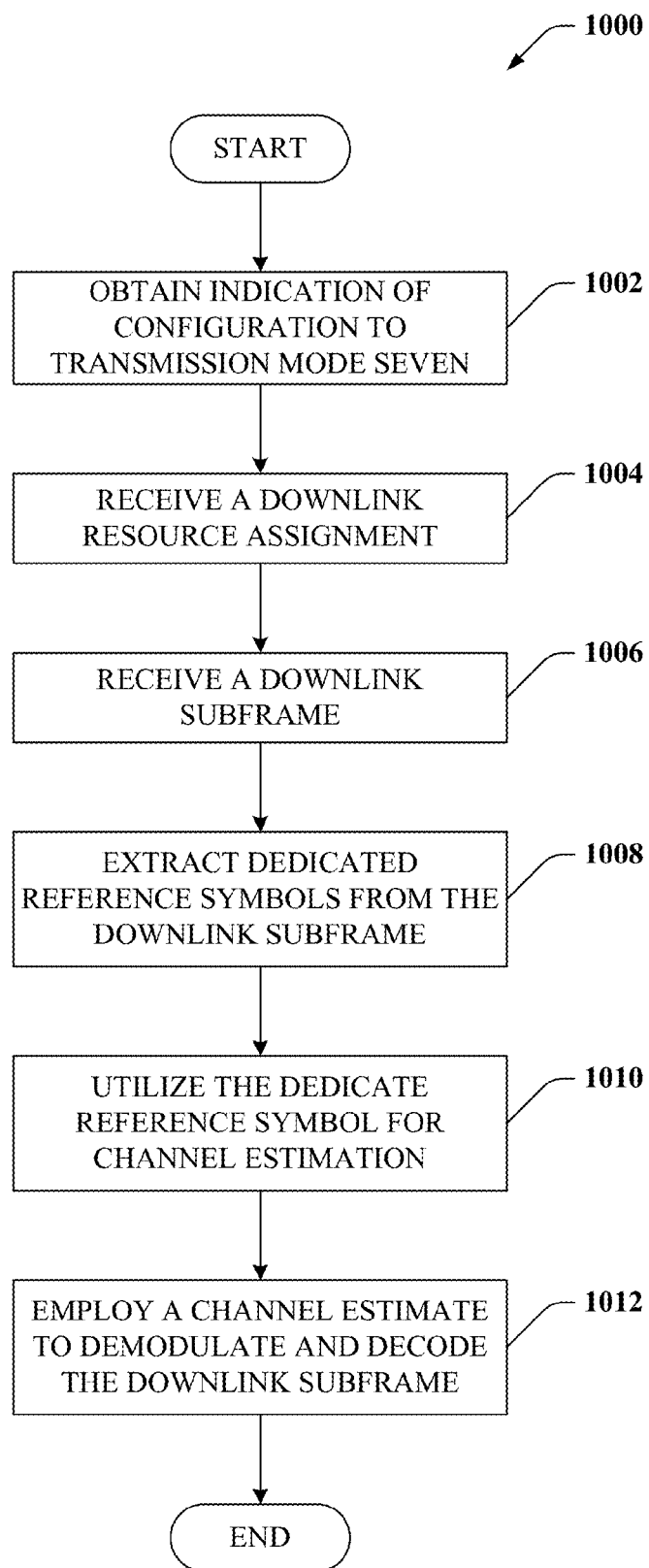
FIG. 10 is an illustration of an example methodology for employing a dedicated reference signal to facilitate channel estimation in accordance with various aspects.

Referring to FIGS. 9-10, methodologies related to employing dedicated reference signals in wireless communication are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 9, illustrated is a method 900 for employing a dedicated reference signal structure in accordance with various aspects. Method 900 can be employed, for example, by an access point (e.g., a base station, eNB, etc.) to facilitate a transmission, employing beamforming, to a mobile device. At reference numeral 902, a mobile device configured to utilize beamforming on a downlink transmission is identified. At reference numeral 904, the identified mobile device is scheduled on the downlink. For example, one or more resource blocks can be allocated to the mobile device to carry data intended for the mobile device. The one or more resource blocks can be assigned to the mobile device for at least one subframe (e.g., TTI). At reference numeral 906, at least one dedicated reference symbol of a dedicated reference signal are inserted into the one or more resource blocks assigned to the mobile device. In one example, the dedicated reference symbols can be mapped to resource elements in the one or more resource blocks in accordance with a selected dedicated reference signal structure. The selected dedicated reference signal structure can vary based upon a rank associated with the downlink transmission. For instance, a structure, such as structure 300 depicted in FIG. 3, can be employed in connection with a rank-2 beamforming transmission. In another example, dedicate reference symbols can be arranged according to a different structure, such as structure 400 illustrated in FIG. 4, can be utilized with a rank-4 beamforming transmission. However, it is to be appreciated that other structures, described herein and/or derived from structures derived herein, can be employed to map reference symbols to resource elements. At reference numeral 908, the one or more resource blocks, with data and dedicated reference symbols, are beamformed and transmitted to the mobile device.

Referring now to FIG. 10, a method 1000 is depicted that facilitates employing a dedicated reference signal to facilitate channel estimation in accordance with various aspects. Method 1000 can be employed, for example, by a mobile device configured to receive downlink transmissions that are beamformed in association with dedicated reference signals. At reference numeral 1002, configuration information is obtained which indicates a transmission mode applied for downlink transmissions. In one example, the transmission mode is a transmission employing beamforming, such as eigen-beamforming, rank-1 beamforming, non-codebook based beamforming, general beamforming, or any suitable type of beamforming for which dedicated reference symbols can be incorporated. At reference numeral 1004, a downlink resource assignment is received. The downlink resource assignment specifies one or more resource blocks in at least one subframe allocated to carry user data destined for the mobile device.

At reference numeral 1006, a downlink subframe is received. In one example, the downlink subframe includes the one or more resource blocks indicated in the downlink resource assignment. At reference numeral 1008, dedicated reference symbols are extracted from the one or more resource blocks of the downlink subframe which are indicated in the downlink resource assignment. Locations of dedicated reference symbols can be inferred from a dedicated reference signal structure utilized in connection with transmitting the one or more resource blocks. The dedicated reference signal structure can be based upon a rank associated with the beamformed transmission. For instance, a structure, such as structure 300 depicted in FIG. 3, can be employed in connection with a rank-2 beamforming transmission. In another example, a different structure, such as structure 400 illustrated in FIG. 4, can be utilized with a rank-4 beamforming transmission.

At reference numeral 1010, the dedicated reference symbols are utilized to generate a channel estimate. In one example, interpolation and/or averaging over multiple dedicated reference symbols can be performed to facilitate channel estimation. For instance, a channel estimate can represent an entire time-frequency grid, however, reference symbols may not be located at a given time-frequency block (e.g., resource element). At reference numeral 1012, the channel estimate is employed to demodulate and decode the one or more resource blocks.

It will be appreciated that, in accordance with one or more aspects described herein, inferences can be made regarding selecting a dedicated reference signal structure, deriving a shifting pattern for a dedicated reference signal structure, generating a channel estimate, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
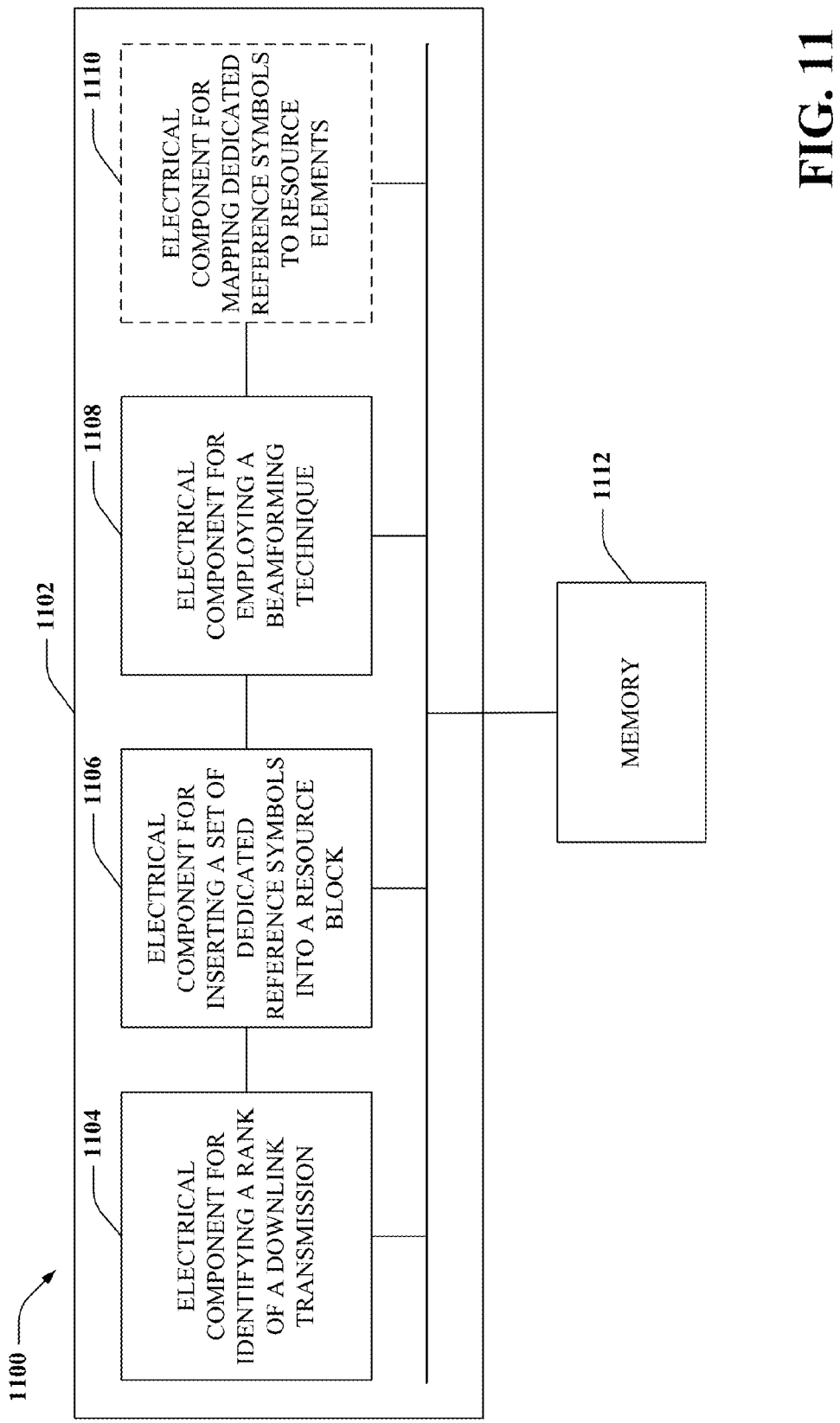
FIG. 11 is an illustration of an example system that facilitates incorporation of dedicated reference signals in a downlink in accordance with various aspects.

With reference to FIG. 11, illustrated is a system 1100 that facilitates incorporation of dedicated reference signals in a downlink in accordance with various aspects. For example, system 1100 can reside at least partially within a base station, a mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for identifying a rank of a downlink transmission 1104. Further, logical grouping 1102 can comprise an electrical component for inserting a set of dedicated reference symbols into a resource block 1106. Moreover, logical grouping 1102 can comprise an electrical component for employing a beamforming technique 1108. Logical grouping 1102 can also, optionally, include an electrical component 1110 for mapping dedicated reference symbols to resource element. Additionally, system 1100 can include a memory 1112 that retains instructions for executing functions associated with electrical components 1104-1110. While shown as being external to memory 1112, it is to be understood that one or more of electrical components 1104, 1106, 1108, and 1110 can exist within memory 1112.

Figure 12:
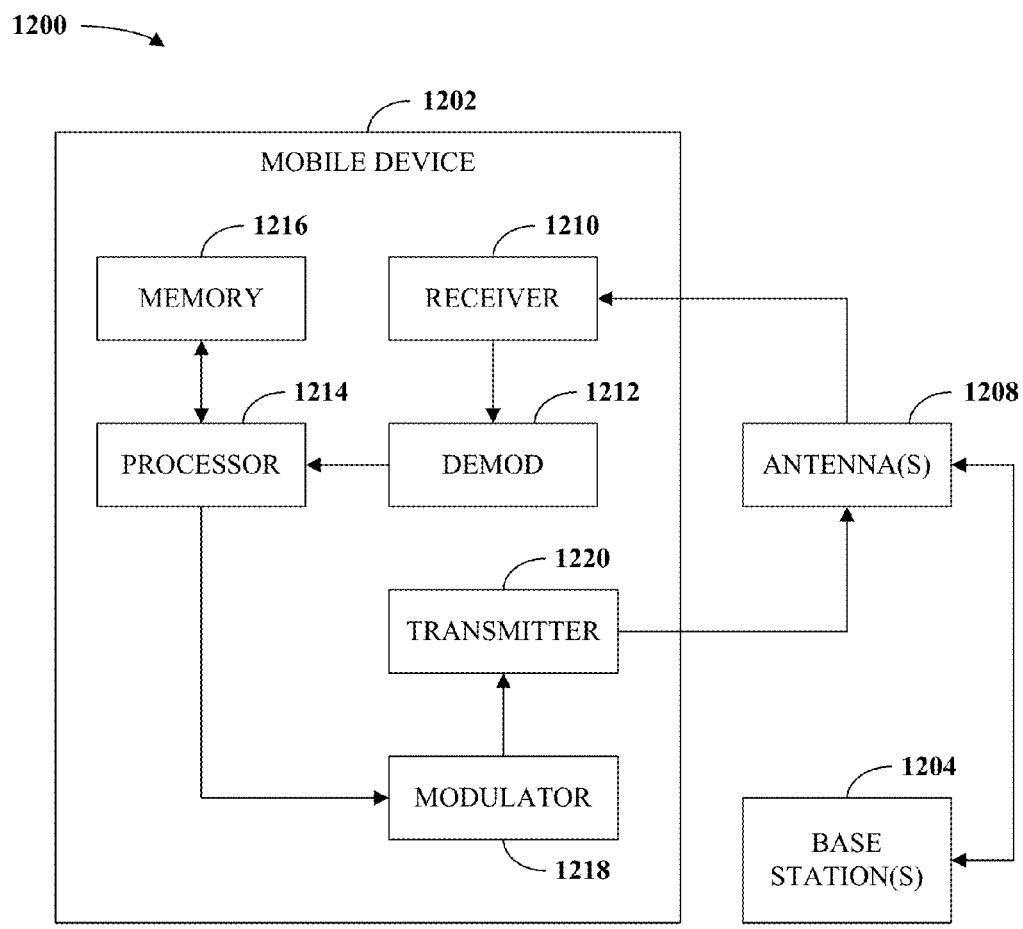
FIG. 12 is an illustration of an example system that facilitates utilization of dedicated reference signals in accordance with various aspects.

FIG. 12 is a block diagram of another system 1200 that can be utilized to implement various aspects of the functionality described herein. In one example, system 1200 includes a mobile device 1202. As illustrated, mobile device 1202 can receive signal(s) from one or more base stations 1204 and transmit to the one or more base stations 1204 via one or more antennas 1208. Additionally, mobile device 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile device 1202. Mobile device 1202 can also include a modulator 1218 that can multiplex a signal for transmission by a transmitter 1220 through antenna(s) 1208.

Figure 13:
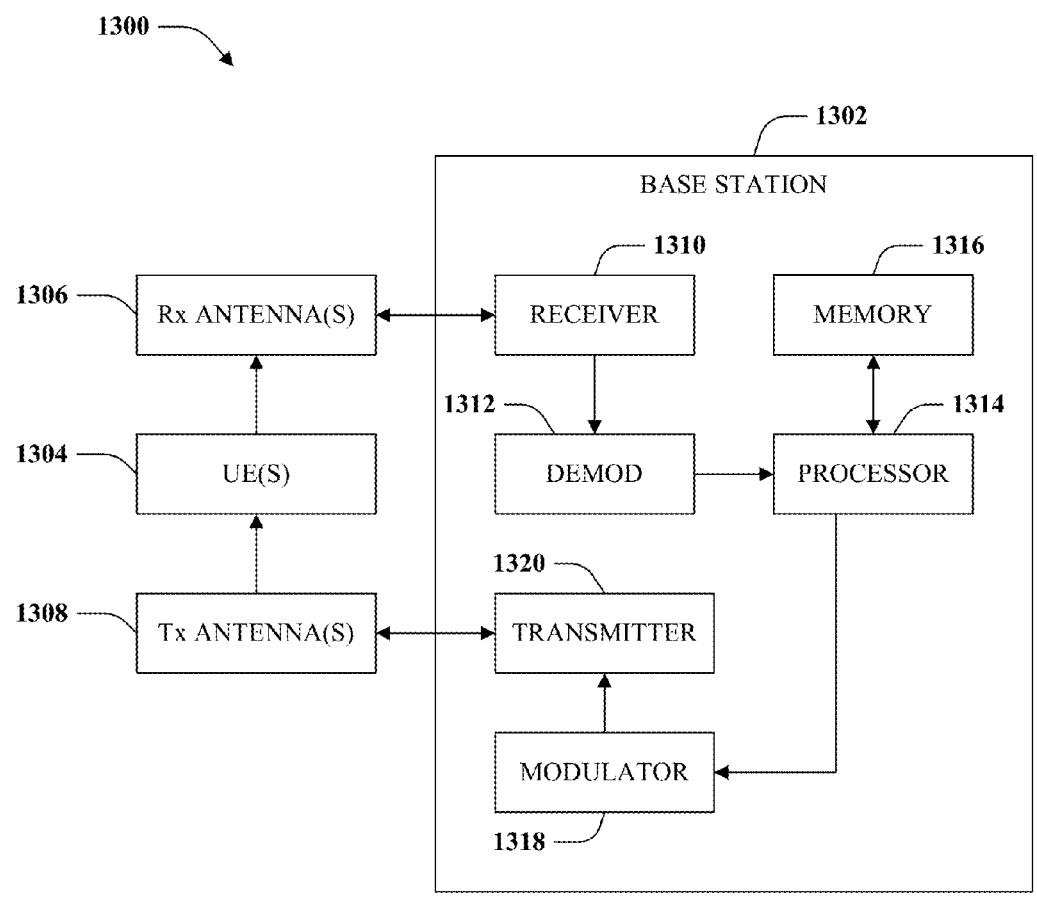
FIGS. 13-14 are block diagrams of respective wireless communication devices that can be utilized to implement various aspects of the functionality described herein.

FIG. 13 is a block diagram of a system 1300 that can be utilized to implement various aspects of the functionality described herein. In one example, system 1300 includes a base station or base station 1302. As illustrated, base station 1302 can receive signal(s) from one or more UEs 1304 via one or more receive (Rx) antennas 1306 and transmit to the one or more UEs 1304 via one or more transmit (Tx) antennas 1308. Additionally, base station 1302 can comprise a receiver 1310 that receives information from receive antenna(s) 1306. In one example, the receiver 1310 can be operatively associated with a demodulator (Demod) 1312 that demodulates received information. Demodulated symbols can then be analyzed by a processor 1314. Processor 1314 can be coupled to memory 1316, which can store information related to code clusters, access terminal assignments, lookup tables related thereto, unique scrambling sequences, and/or other suitable types of information. Base station 1302 can also include a modulator 1318 that can multiplex a signal for transmission by a transmitter 1320 through transmit antenna(s) 1308.

Figure 14:
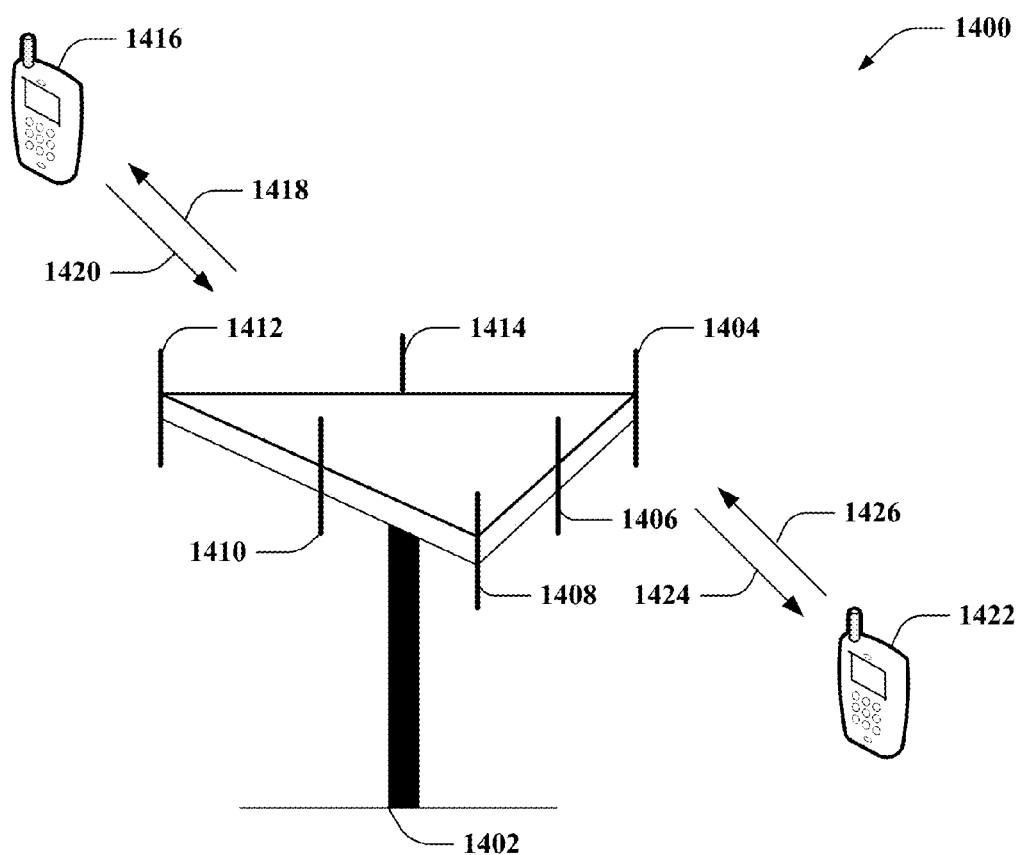

Referring now to FIG. 14, a wireless communication system 1400 is illustrated in accordance with various embodiments presented herein. System 1400 comprises a base station (e.g., access point) 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1402 can communicate with one or more UEs such as UE 1416 and UE 1422; however, it is to be appreciated that base station 1402 can communicate with substantially any number of UEs similar to UEs 1416 and 1422. UEs 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, UE 1416 is in communication with antennas 1412 and 1414, where antennas 1412 and 1414 transmit information to UE 1416 over a downlink 1418 and receive information from UE 1416 over an uplink 1420. Moreover, UE 1422 is in communication with antennas 1404 and 1406, where antennas 1404 and 1406 transmit information to UE 1422 over a downlink 1424 and receive information from UE 1422 over an uplink 1426. In a frequency division duplex (FDD) system, downlink 1418 can utilize a different frequency band than that used by uplink 1420, and downlink 1424 can employ a different frequency band than that employed by uplink 1426, for example. Further, in a time division duplex (TDD) system, downlink 1418 and uplink 1420 can utilize a common frequency band and downlink 1424 and uplink 1426 can utilize a common frequency band.

Each group of antennas and/or the area in which they are designated to communicate can be referred to as a sector of base station 1402. For example, antenna groups can be designed to communicate to UEs in a sector of the areas covered by base station 1402. In communication over downlinks 1418 and 1424, the transmitting antennas of base station 1402 can utilize beamforming to improve signal-to-noise ratio of downlinks 1418 and 1424 for UEs 1416 and 1422. Also, while base station 1402 utilizes beamforming to transmit to UEs 1416 and 1422 scattered randomly through an associated coverage, UEs in neighboring cells can be subject to less interference as compared to a base station transmitting through a single antenna to all its UEs. Moreover, UEs 1416 and 1422 can communicate directly with one another using a peer-to-peer or ad hoc technology (not shown).

According to an example, system 1400 can be a multiple-input multiple-output (MIMO) communication system. Further, system 1400 can utilize substantially any type of duplexing technique to divide communication channels (e.g., downlink, uplink, ...) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1402 can communicate to the UEs 1416 and 1422 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 15:
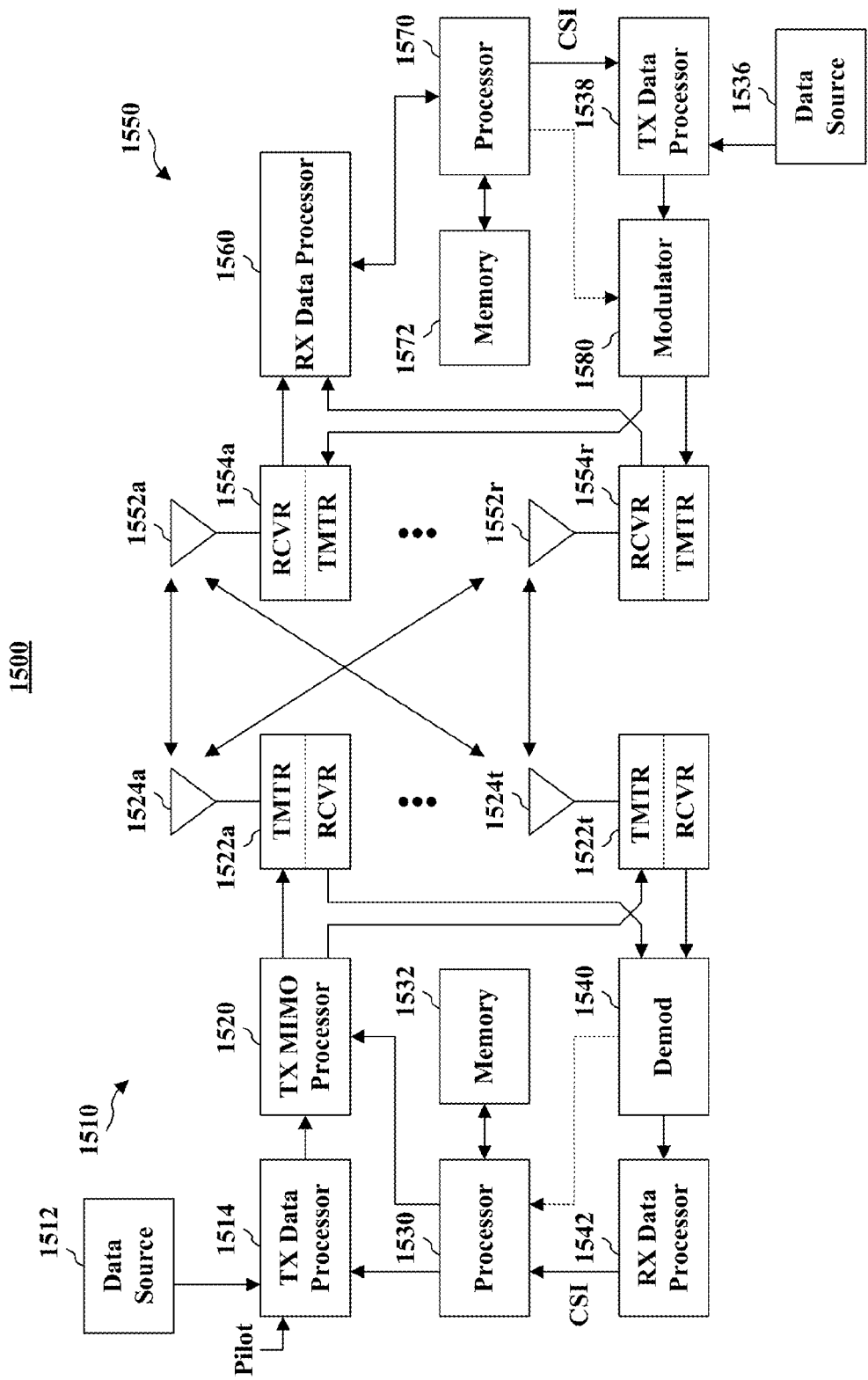
FIG. 15 is an illustration of a wireless communication system in accordance with various aspects set forth herein.

FIG. 15 shows an example wireless communication system 1500. The wireless communication system 1500 depicts one base station 1510 and one access terminal 1550 for sake of brevity. However, it is to be appreciated that system 1500 can include more than one base station and/or more than one access terminal, wherein additional base stations and/or access terminals can be substantially similar or different from example base station 1510 and access terminal 1550 described below. In addition, it is to be appreciated that base station 1510 and/or access terminal 1550 can employ the systems (FIGS. 1-2 and FIG. 11) and/or method (FIGS. 9-10) described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At access terminal 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which available technology to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from access terminal 1550 are received by antennas 1524, conditioned by receivers 1522, demodulated by a demodulator 1540, and processed by a RX data processor 1542 to extract the reverse link message transmitted by access terminal 1550. Further, processor 1530 can process the extracted message to determine which precoding matrix to use for determining the beamforming weights.

Processors 1530 and 1570 can direct (e.g., control, coordinate, manage, etc.) operation at base station 1510 and access terminal 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PS-DCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying a rank of a downlink transmission to a mobile device, wherein the rank indicates utilization of one of two or four antennas;
    inserting a set of dedicated reference symbols into a resource block in accordance with a dedicated reference signal structure, wherein the dedicated reference signal structure is associated with the rank; and
    employing a beamforming technique to transmit the resource block that includes the set of dedicated reference symbols to the mobile device,
    wherein when the rank indicates two antennas, the dedicated reference signal structure specifies a group of pairs of dedicated reference symbols, wherein a pair of dedicated reference symbols are located on a same subcarrier and in consecutive symbols of the resource block.

2. The method of claim 1, wherein inserting the set of dedicated reference symbols comprising mapping the set of dedicated reference symbols to a set of resource elements in accordance with the dedicated reference signal structure.

3. The method of claim 2, wherein the dedicated reference signal structure specifies one or more resource elements, within the resource block, at which a dedicated reference symbol is placed.

4. The method of claim 1, wherein the set of dedicated reference symbols comprises eighteen symbols when the rank indicates two antennas.

5. The method of claim 1, wherein the dedicated reference signal structure further specifies that respective pairs of dedicated reference symbols from the group of pairs of dedicated reference symbols are placed with a separation of at least three symbols in between the respective pairs in a time domain and at least four subcarriers in between the respective pairs in a frequency domain.

6. The method of claim 1, wherein the set of dedicated reference symbols comprises twenty-four symbols when the rank indicates four antennas.

7. The method of claim 1, further comprising selecting the dedicated reference signal structure in accordance with the rank.

8. A method, comprising:
    identifying a rank of a downlink transmission to a mobile device, wherein the rank indicates utilization of one of two or four antennas;
    inserting a set of dedicated reference symbols into a resource block in accordance with a dedicated reference signal structure, wherein the dedicated reference signal structure is associated with the rank; and employing a beamforming technique to transmit the resource block that includes the set of dedicated reference symbols to the mobile device wherein when the rank indicates four antennas the dedicated reference signal structure specifies a set of groups of dedicated reference symbols, wherein a group of dedicated reference symbols comprises four symbols arranged in a two-symbol by two-subcarrier square.

9. The method of claim 8, wherein the dedicated reference signal structure further specifies that respective groups of dedicated reference symbols are placed with a separation of at least three symbols in between the respective groups in a time domain and at least three subcarriers in a frequency domain.

10. A wireless communications apparatus, comprising:
at least one processor configured to:
select a dedicated reference signal structure based upon a rank of a transmission, wherein the rank indicates that the transmission utilizes one of two or four antennas;
incorporate a dedicated reference signal comprising a set of dedicated reference symbols into a resource block in accordance with the dedicated reference signal structure selected; and
utilize a beamforming technique to transmit the resource block with the dedicated reference signal incorporated,
wherein when the rank indicates two antennas, the dedicated reference signal structure specifies a group of pairs of dedicated reference symbols, wherein a pair of dedicated reference symbols are located on a same subcarrier and in consecutive symbols of the resource block; and a memory couple to the processor for storing the dedicated reference signal structure.

11. The wireless communications apparatus of claim 10, wherein the set of dedicated reference symbols comprises eighteen symbols when the rank indicates two antennas.

12. The wireless communications apparatus of claim 10, wherein the dedicated reference signal structure further specifies that respective pairs of dedicated reference symbols from the group of pairs of dedicated reference symbols are placed with a separation of at least three symbols in between the respective pairs in a time domain and at least four subcarriers in between the respective pairs in a frequency domain.

13. The wireless communications apparatus of claim 10, wherein the set of dedicated reference symbols comprises twenty-four symbols when the rank indicates four antennas.

14. The wireless communications apparatus of claim 10, wherein the dedicated reference signal structure further specifies that respective groups of dedicated reference symbols are placed with a separation of at least three symbols in between the respective groups in a time domain and at least three subcarriers in a frequency domain.

15. A wireless communications apparatus, comprising:
at least one processor configured to:
select a dedicated reference signal structure based upon a rank of a transmission, wherein the rank indicates that the transmission utilizes one of two or four antennas;
incorporate a dedicated reference signal comprising a set of dedicated reference symbols into a resource block in accordance with the dedicated reference signal structure selected; and
utilize a beamforming technique to transmit the resource block with the dedicated reference signal incorporated,
wherein when the rank indicates four antennas the dedicated reference signal structure specifies a set of groups of dedicated reference symbols, wherein a group of dedicated reference symbols comprises four symbols arranged in a two-symbol by two-subcarrier square; and a memory couple to the processor for storing the dedicated reference signal structure.

16. An apparatus, comprising:
means for identifying a rank of a downlink transmission to a mobile device, wherein the rank indicates utilization of one of two or four antennas;
means for inserting a set of dedicated reference symbols into a resource block in accordance with a dedicated reference signal structure, wherein the dedicated reference signal structure is associated with the rank; and
means for employing a beamforming technique to transmit the resource block that includes the set of dedicated reference symbols to the mobile device,
wherein when the rank indicates two antennas, the dedicated reference signal structure specifies a group of pairs of dedicated reference symbols, wherein a pair of dedicated reference symbols are located on a same subcarrier and in consecutive symbols of the resource block.

17. The apparatus of claim 16, further comprising means for mapping the set of dedicated reference symbols to a set of resource elements in accordance with the dedicated reference signal structure.

18. The apparatus of claim 17, wherein the dedicated reference signal structure specifies one or more resource elements, within the resource block, at which a dedicated reference symbol is placed.

19. The apparatus of claim 16, wherein the set of dedicated reference symbols comprises eighteen symbols when the rank indicates two antennas.

20. The apparatus of claim 16, wherein the dedicated reference signal structure further specifies that respective pairs of dedicated reference symbols from the group of pairs of dedicated reference symbols are placed with a separation of at least three symbols in between the respective pairs in a time domain and at least four subcarriers in between the respective pairs in a frequency domain.

21. The apparatus of claim 16, wherein the set of dedicated reference symbols comprises twenty-four symbols when the rank indicates four antennas.

22. The apparatus of claim 16, further comprising selecting the dedicated reference signal structure in accordance with the rank.

23. An apparatus, comprising:
means for identifying a rank of a downlink transmission to a mobile device, wherein the rank indicates utilization of one of two or four antennas;
means for inserting a set of dedicated reference symbols into a resource block in accordance with a dedicated reference signal structure, wherein the dedicated reference signal structure is associated with the rank; and
means for employing a beamforming technique to transmit the resource block that includes the set of dedicated reference symbols to the mobile device,
wherein when the rank indicates four antennas the dedicated reference signal structure specifies a set of groups of dedicated reference symbols, wherein a group of dedicated reference symbols comprises four symbols arranged in a two-symbol by two-subcarrier square.

24. The apparatus of claim 23, wherein the dedicated reference signal structure further specifies that respective groups of dedicated reference symbols are placed with a separation of at least three symbols in between the respective groups in a time domain and at least three subcarriers in a frequency domain.

25. A computer program product, comprising:
a non-transitory computer-readable medium, comprising:
code for causing at least one computer to select a dedicated reference signal structure based upon a rank of a transmission, wherein the rank indicates that the transmission utilizes one of two or four antennas;
code for causing the at least one computer to embed a dedicated reference signal comprising a set of dedicated reference symbols into a resource block in accordance with the dedicated reference signal structure selected; and
code for causing the at least one computer to utilize a beamforming technique to transmit the resource block with the dedicated reference signal incorporated,
wherein when the rank indicates two antennas, the dedicated reference signal structure specifies a group of pairs of dedicated reference symbols, wherein a pair of dedicated reference symbols are located on a same subcarrier and in consecutive symbols of the resource block.

26. The computer program product of claim 25, wherein the set of dedicated reference symbols comprises eighteen symbols when the rank indicates two antennas.

27. The computer program product of claim 25, wherein the dedicated reference signal structure further specifies that respective pairs of dedicated reference symbols from the group of pairs of dedicated reference symbols are placed with a separation of at least three symbols in between the respective pairs in a time domain and at least four subcarriers in between the respective pairs in a frequency domain.

28. The computer program product of claim 25, wherein the set of dedicated reference symbols comprises twenty-four symbols when the rank indicates four antennas.

29. A computer program product, comprising:
a non-transitory computer-readable medium, comprising:
code for causing at least one computer to select a dedicated reference signal structure based upon a rank of a transmission, wherein the rank indicates that the transmission utilizes one of two or four antennas;
code for causing the at least one computer to embed a dedicated reference signal comprising a set of dedicated reference symbols into a resource block in accordance with the dedicated reference signal structure selected; and
code for causing the at least one computer to utilize a beamforming technique to transmit the resource block with the dedicated reference signal incorporated,
wherein when the rank indicates four antennas the dedicated reference signal structure specifies a set of groups of dedicated reference symbols, wherein a group of dedicated reference symbols comprises four symbols arranged in a two-symbol by two-subcarrier square.

30. The computer program product of claim 29, wherein the dedicated reference signal structure further specifies that respective groups of dedicated reference symbols are placed with a separation of at least three symbols in between the respective groups in a time domain and at least three subcarriers in a frequency domain.

31. An apparatus, comprising:
a rank selection circuit that determines a rank level associated with a downlink transmission, wherein the rank level can be one of two or four;
a dedicated reference signal circuit that generates a dedicated reference signal comprising a set of dedicated reference symbols, wherein the dedicated reference signal circuit incorporates the dedicated reference signal into a resource block in accordance with a dedicated reference signal structure selected based upon the rank level;
a precoder circuit that applies a beamforming technique to the resource block with the dedicated reference signal incorporated; and
a transmitter that sends the resource block with the dedicated reference signal incorporated on a downlink channel,
wherein when the rank indicates two antennas, the dedicated reference signal structure specifies a group of pairs of dedicated reference symbols, wherein a pair of dedicated reference symbols are located on a same subcarrier and in consecutive symbols of the resource block.

32. The apparatus of claim 31, further comprising a scheduler that assigns the resource block to a mobile device.

33. The apparatus of claim 31, wherein the precoder circuit employs frequency selective precoding.

34. The apparatus of claim 31, wherein the set of dedicated reference symbols comprises eighteen symbols when the rank level indicates two antennas.

35. The apparatus of claim 31, wherein the dedicated reference signal structure further specifies that respective pairs of dedicated reference symbols from the group of pairs of dedicated reference symbols are placed with a separation of at least three symbols in between the respective pairs in a time domain and at least four subcarriers in between the respective pairs in a frequency domain.

36. The apparatus of claim 31, wherein the set of dedicated reference symbols comprises twenty-four symbols when the rank level indicates four antennas.

37. An apparatus, comprising:
a rank selection circuit that determines a rank level associated with a downlink transmission, wherein the rank level can be one of two or four;
a dedicated reference signal circuit that generates a dedicated reference signal comprising a set of dedicated reference symbols, wherein the dedicated reference signal circuit incorporates the dedicated reference signal into a resource block in accordance with a dedicated reference signal structure selected based upon the rank level;
a precoder circuit that applies a beamforming technique to the resource block with the dedicated reference signal incorporated; and
a transmitter that sends the resource block with the dedicated reference signal incorporated on a downlink channel,
wherein when the rank level indicates four antennas the dedicated reference signal structure specifies a set of groups of dedicated reference symbols, wherein a group of dedicated reference symbols comprises four symbols arranged in a two-symbol by two-subcarrier square.

38. The apparatus of claim 37, wherein the dedicated reference signal structure further specifies that respective groups of dedicated reference symbols are placed with a separation of at least three symbols in between the respective groups in a time domain and at least three subcarriers in a frequency domain.

* * * * *